United States Patent
Hughes et al.

(10) Patent No.: US 6,417,242 B1
(45) Date of Patent: Jul. 9, 2002

(54) PROPYLENE POLYMER FOAMS

(75) Inventors: Kevin R. Hughes, Hemlock; Robert L. Sammler, Midland; Kyung W. Suh, Midland; Jin Zhao, Midland, all of MI (US); Johan A. Thoen, Terneuzen (NL); Martin H. Tusim, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/970,282

(22) Filed: Oct. 2, 2001

Related U.S. Application Data

(60) Provisional application No. 60/242,590, filed on Oct. 23, 2000.

(51) Int. Cl.[7] .................................................. C08J 9/00
(52) U.S. Cl. ...................... 521/142; 521/79; 521/143; 521/144; 521/134; 525/304; 525/305; 525/376
(58) Field of Search ................................ 521/142, 143, 521/134, 79

(56) References Cited

U.S. PATENT DOCUMENTS

| | | |
|---|---|---|
| 3,058,944 A | 10/1962 | Breslow et al. |
| 3,336,268 A | 8/1967 | Cox |
| 3,530,108 A | 9/1970 | Oppenlander |
| 4,323,528 A | 4/1982 | Collins |
| 4,591,606 A | 5/1986 | Bergstrom |
| 4,714,716 A | 12/1987 | Park |
| 4,824,720 A | 4/1989 | Malone |
| 4,916,198 A | 4/1990 | Scheve et al. |
| 5,116,881 A | 5/1992 | Park et al. |
| 5,180,751 A | 1/1993 | Park et al. |
| 5,416,169 A | 5/1995 | Saito et al. |
| 5,527,573 A | 6/1996 | Park et al. |
| 5,591,785 A | 1/1997 | Scheve et al. |
| 5,605,936 A | 2/1997 | DeNichola, Jr. et al. |
| 5,731,362 A | 3/1998 | Scheve et al. |
| 5,883,151 A | 3/1999 | Raetzsch et al. |
| 5,929,127 A | 7/1999 | Raetzsch et al. |
| 5,962,594 A | 10/1999 | Raetzsch et al. |
| 6,054,540 A | 4/2000 | Chaudhary et al. |
| 6,225,366 B1 | 5/2001 | Raetzsch et al. |
| 6,284,842 B1 | 9/2001 | Ho et al. |

FOREIGN PATENT DOCUMENTS

| | | |
|---|---|---|
| JP | 7-138422 | 5/1995 |
| WO | WO 9910424 | 3/1999 |
| WO | WO 9910425 | 3/1999 |

*Primary Examiner*—Morton Foelak

(57) ABSTRACT

The present invention relates to a foam, a process for preparing the foam and an article containing the foam. The foam contains a coupled propylene polymer and has a density in of from 9.6 to 801 kg/m$^3$ and has either a foamability factor of more than 1.8 to less than 2.8 and an open cell content less than 20 percent, or a foamability factor of at least 2.8 and less than 15 and an open cell content of less than 50 percent. The process includes heating a coupled propylene polymer having a melt flow rate from 0.2 to 20 g/10 min and a melt strength of at least 39 cN to a molten state to produce a molten polymer material and mixing said molten polymer material with a blowing agent under conditions to produce a foamed material having a density in the range of from 9.6 to 801 kg/m$^3$.

7 Claims, No Drawings

PROPYLENE POLYMER FOAMS

CROSS REFERENCE STATEMENT

This application claims the benefit of U.S. Provisional Application No. 60/242,590, filed Oct. 23, 2000.

FIELD OF THE INVENTION

This invention relates to propylene polymer foams, methods for preparing the same, expandable compositions, and foamed articles.

BACKGROUND

Polypropylene can offer better impact properties than polystyrene, because polypropylene is a semi-crystalline polymer which has a glass transition temperature substantially below room temperature. In addition, polypropylene can offer good temperature stability and high chemical resistance. However, until now, the production of polypropylene foams has been limited because of its low melt strength and melt elasticity and this makes it difficult to be foamed in comparison to the other plastics. If the melt strength and the melt elasticity are too weak, as in the case of polypropylene, the cell walls separating the bubbles will be too weak to bear the extensional force that is generated during the foaming process and the bubbles will rupture very easily. As a result, foamed polypropylene products are generally characterized by high open cell content, which makes them unsatisfactory in many applications.

Extruded closed cell foams of polypropylene having a foamability factor of less than about 1.8 are disclosed in U.S. Pat. No. 5,527,573. Branched or lightly crosslinked polymers, such as may be obtained by chemical or irradiation branching or lightly crosslinking, including high melt strength polypropylene are used therein for making foams. In co-pending U.S. patent application Ser. No. 09/133,576 filed Aug. 13, 1998 and WO-99/10424 in-situ rheology modification of polyolefins is disclosed as applied to, among others, polypropylenes resulting in polypropylenes having advantageous melt processing properties. Foams are mentioned among the possible end uses or applications of such rheology-modified propylene polymers.

There is a continuous demand for propylene polymer foams of a relatively high closed cell content, which do not suffer from the bubble stability problem generally experienced with polypropylene foams. The foams desirably are capable of being manufactured at high foam production rates on conventional foaming equipment while using a relatively low amount of blowing agent.

SUMMARY OF THE INVENTION

The present invention is directed in one aspect to a foam comprising a coupled propylene polymer and having a density in the range of from 9.6 to 801 kilograms per cubic meter ($kg/m^3$) (0.6 to 50 pounds per cubic foot ($lbs/ft^3$)) and having either a foamability factor of more than 1.8 to less than 2.8 and an open cell content less than 20 percent (%), or a foamability factor of equal to or more than 2.8 and less than 15 and an open cell content of less than 50%. The invention includes in a further aspect a process for preparing a foam comprising heating a propylene polymer having a melt flow rate from 0.2 to 20 grams per 10 minutes (g/10 min) and a melt strength of at least 39 centiNewtons (cN), optionally mixed with a nucleating agent, to a molten state to produce a molten polymer material, and mixing said molten polymer material with a blowing agent under conditions to produce a foamed material having a density in the range of from 9.6 to 801 $kg/m^3$ (0.6 to 50 $lbs/ft^3$), wherein the propylene polymer is obtained by a coupling treatment carried out before, during or after admixture with the blowing agent. According to yet a further aspect the invention relates to an expandable composition comprising a coupled propylene polymer having a melt strength of $\geq 39$ cN at a drawability from 15 to 60 millimeters per second (mm/sec), and a melt flow rate from 0.2 to 20 g/10 min, and a blowing agent.

Finally, the present invention relates to articles comprising the foams according to the present invention. It has been found that excellent foams can be obtained from certain propylene polymers which due to their melt strength and melt drawability characteristics provide higher thermal collapse resistance, and therefore less open cell content and lower density than prior art polypropylenes.

DETAILED DESCRIPTION OF THE INVENTION

As used herein the "foam density" is determined by weighing a small representative piece of foam and dividing this by the volumetric displacement of the foam.

As used herein the terms "melt strength" and "drawability" refer to polymer melt properties and are measured at 190° C. according to the following procedure. Measure melt strength by using a capillary rheometer fitted with a 2.1 millimeter (mm) diameter, 20:1 die with an entrance angle of approximately 45 degrees. After equilibrating the samples at 190° C. for 10 minutes, run the piston at a speed of 25.4 millimeters per minute (mm/minute). The standard test temperature is 190° C. The sample is drawn uniaxially to a set of accelerating nips located 100 mm below the die with an acceleration of 2.4 millimeters per second per second ($mm/sec^2$). The required tensile force is recorded as a function of the take-up speed of the nip rolls. The maximum tensile force attained during the test (at break) is defined as the melt strength and is expressed in cN. The limiting wheel velocity at break is the melt drawability and reported in units of mm/s. In the case of polymer melt exhibiting draw resonance, the tensile force and wheel velocity before the onset of draw resonance was taken as the melt strength and drawability, respectively.

As used herein the "average cell size" in millimeters is determined according to American Society for Testing and Materials (ASTM) D3576 Standard Test Method for Cell Size of Rigid Cellular Plastics.

As used herein the term "melt flow rate" refers to the melt flow rate of the polymer measured according to method ASTM D 1238L, at a temperature of 230° C. under a weight of 2.16 kg and is expressed in g/10 min.

As used herein the term "isotactic" refers to a degree of isotacticity as measured by $C^{13}$ NMR of at least about 50%.

As used herein, "propylene polymer" means propylene polymer selected from the group consisting of (a) homopolymers of propylene, (b) random and block copolymers of propylene and an olefin selected from the group consisting of ethylene, $C_4$–$C_{10}$ 1-olefins, and $C_4$–$C_{10}$ dienes, provided that, when said olefin is ethylene, the maximum polymerized ethylene content is less than about 20% by weight, when said olefin is a $C_4$–$C_{10}$ 1-olefin, the maximum polymerized content thereof is less than about 20% by weight and when said olefin is a $C_4$–$C_{10}$ diene, the maximum polymerized content thereof is less than about 20% by weight, (c) random terpolymers of propylene and 1-olefins selected from the group consisting of ethylene and $C_4$–$C_8$ 1-olefins, provided that the maximum polymerized $C_4$–$C_8$ 1-olefin content is less than about 20% by weight, and when ethylene is one of said 1-olefins, the maximum polymerized ethylene content is less than about 20% by weight, and d) impact propylene copolymers also referred to as heterophasic propylene copolymers where polypropylene is the continuous phase and an elastomeric phase is uniformly dispersed therein. Advantageously, the impact copolymers have at least about 5 weight percent, preferably at least about 10, preferably up to about 40, more preferably up to about 25 weight percent, and most preferably up to about 20 weight percent ethylene. The $C_4$–$C_{10}$ 1-olefins include the linear and branched $C_4$–$C_{10}$ 1-olefins such as, for examples 1-butene, isobutylene, 1-pentene, 3-methyl-1-buterie, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, 2,3-dimethyl-1,3-hexadiene, and the like.

The term "isotactic propylene polymer" refers to a propylene polymer having preferably no or only a very minor percentage of comonomers polymerized in its structure and has in general an isotacticity of at least 50% as determined by $^{13}$C NMR, more preferably an isotacticity of at least 52%, and most preferably of at least 54%. It preferably is a propylene homopolymer.

Surprisingly it has been found that a certain novel combinations of propylene polymer resin properties and final propylene polymer foam product properties produce the increased closed cell foams of the present invention.

The foamability factor is the combination of these properties. This factor is expressed by the following equation:

$$F = Dn * D * (\tan \delta)^{0.75}$$

where

F is the foamability factor

Dn is the density of the foam in lbs/ft³ or $Dn = Dn^*/16.02$ wherein $Dn^*$ is the density of the foam in kg/m³;

D is the average cell size diameter in millimeters;

tan δ is G"/G'; where G" is the loss modulus; and G' is the storage modulus of the polymer melt using 2.5 mm thick and 25 mm diameter specimens at 190° C. (centigrade) at one Radian per second oscillating frequency.

According to the present invention the foams have a foamability factor of more than 1.8 to less than 2.8, preferably from 1.9 to 2.8, more preferably from 2.0 to 2.5 and simultaneously an open cell content of less than 20%. Alternatively, the foams have a foamability factor of equal to or more than 2.8 and less than 15, preferably less than 10, more preferably less than 6, still more preferably less than 5, even more preferably less than 4 and simultaneously an open cell content of less than 50%, preferably of less than 45%.

The parameter tan δ may be determined by using a mechanical spectrometer, such as model RMS-800, available from Rheometrics, Inc. in Piscataway, N.J., USA. In the evaluation of rheological characteristics, such as tan δ, G' and G", of viscoelastic materials, such as polymer melts, a disk-like specimen, measuring 2.5 mm in thickness and 25 mm in diameter is placed between opposed, axially spaced apart, radially-extending surfaces and is coupled to each surface, filling the axial spacing between the surfaces. One of the surfaces then is rotated about the axial direction relative to the other to place the test specimen in shear and the torque resulting from the shear is measured. The shear may be steady shear, in which case the measured torque is constant, or the shear may be dynamic shear, in which case the measured torque changes continuously with time. The measured torque is proportional to the viscous, or loss component of the modulus (G") of the material. For the purpose of this invention the shear is steady shear, meaning the measured torque, and thus G", is constant at the given temperature. As a result of the nature of the forces applied to the test specimen in this procedure, the test specimen has a tendency to expand axially, thereby placing axially directed forces upon the relatively rotating surfaces to which the specimen is coupled. This axial force exerted upon the surfaces by the test specimen under shear conditions is proportional to the elastic, or storage component of the modulus (G') of the material. The parameter tan δ for the present invention is then calculated as G" divided by G' at the stated temperature and oscillating frequency.

In addition to meeting the foamability factor requirement, the mixture of the blowing agent and propylene polymer material (foaming gel) is cooled down to the optimum foaming temperature, which is easily determined experimentally.

The melt flow rate of the propylene polymer used for preparing the foams according to the present invention is generally from 0.2 to 20 g/10 min, preferably from 0.3 to 10 g/10 min and most preferably from 0.4 to 5 g/10 min as measured by ASTM D1238L at 230° C./2.16 kilograms (kg). At melt flow rates below these ranges the polymer will be more difficult to extrude, while above these ranges it will be difficult to make foam having large cross-sections. The propylene polymer in general has a melt strength of at least about 39 cN, preferably at least about 40 cN, most preferably at least about 50 cN, and in some instances at least about 60 cN. The propylene polymer exhibits these melt strength values preferably at a melt drawability of from 15 to 60 mm/sec. The drawability property allows the drawing of the cells to small diameters, whereas the melt strength provides sufficient strength to form closed cells. Propylene polymers having such suitable melt strength and melt drawability properties allow the production of foams of a broad density range and of good mechanical properties with the possibility of controlling cell size and open cell content.

The propylene polymer is obtained from conventional propylene polymers that have been treated to provide the desirable properties melt properties by chemical treatment with coupling or branching agents. Preferred coupling treatments are disclosed in U.S. patent application Ser. No. 09/133,576 filed Aug. 13, 1998 and WO 99/10424 published Mar. 4, 1999 (which are both incorporated by reference herein in their entirety).

The propylene polymers used in the current invention are thermoplastic polymers and not crosslinked polymers. Crosslinking (otherwise known as "vulcanization") results in a thermoset polymer characterized by high gel levels. Crosslinking is typically evidenced by gel formation which is measured in the case of polypropylene by xylene insolubility, or in the case of films by optically evident gels in a film, for instance as analyzed by a laser gel counter commercially available from Optical Control System, Inc. under the trade designation FS-3.

The polymer materials that are subjected to such a treatment are suitably of any molecular weight distribution (MWD). MWD is calculated as the ratio $M_w/M_n$ where $M_w$ is the weight average molecular weight and $M_n$ is the number average molecular weight. Those skilled in the art are aware that polymers having a MWD less than about 3 are conveniently made using a metallocene or constrained geometry catalyst or using electron donor compounds with Ziegler Natta catalysts. In the practice of the invention, the MWD is preferably at least from about 3.5 to about 15 and more preferably from about 6 to about 9.

The most preferred way of preparing the propylene polymers used for making the foams of the current invention is by a coupling treatment such as disclosed in U.S. patent application Ser. No. 09/133,576 filed Aug. 13, 1998 and WO 99/10424 published Mar. 4, 1999. As used herein, "coupling" refers to modifying the rheology of a polymer by reacting the polymer with a suitable coupling agent. A "coupled polymer" is a rheology modified polymer resulting from a coupling reaction. Coupled polymers are also referred to herein as "modified polymers" or "rheology modified polymers." A coupled polymer differs from a crosslinked polymer in that the coupled polymer is thermoplastic and has a low gel level.

According to this preferred treatment, the propylene polymer resin is reacted with a polyfunctional compound capable of insertion reactions into C—H bonds. Such polyfunctional compounds have at least two, preferably 2, functional groups capable of forming reactive groups that are capable of C—H insertion reactions. Those skilled in the art are familiar with C—H insertion reactions and reactive groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A.; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7) 883–9.

Compounds having at least two functional groups capable of forming reactive groups that are capable of C—H insertion under reaction conditions are referred to herein as coupling agents. Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides ($R_2$—P(O)—$N_3$)and silyl azides ($R_3$—Si—$N_3$). Preferably, the coupling agent is a poly (sulfonyl azide). U.S. patent application Ser. No. 09/133,576 filed Aug. 13, 1998 and WO 99/10424 published Mar. 4, 1999 contain additional teaching regarding azides and their use for modifying polymers.

When the poly(sulfonyl azide) reacts with the propylene polymer resin, at least two separate propylene polymer chains are advantageously joined and the molecular weight of the polymer chain is increased. In the preferred case when the poly(sulfonyl azide) is a bis(sulfonyl azide) (hereinafter "BSA"), two propylene polymer chains are advantageously joined.

The poly(sulfonyl azide) is any compound having at least two sulfonyl azide groups (—$SO_2N_3$) reactive with the propylene polymer. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes. The term inertly substituted refers to substitution with atoms or groups that do not undesirably interfere, at the coupling reaction conditions, with the desired reaction(s) or desired properties of the resulting coupled polymers. Such groups include fluorine, aliphatic or aromatic ether, siloxane as well as sulfonyl azide groups when more than two propylene polymer chains are to be joined. R is suitably aryl, alkyl, aryl alkaryl, arylalkyl silane, siloxane or heterocyclic, groups and other groups that are inert and separate the sulfonyl azide groups as described. More preferably R includes at least one aryl group between the sulfonyl groups, most preferably at least two aryl groups (such as when R is 4,4'diphenylether or 4,4'-biphenyl). When R is one aryl group, it is preferred that the group have more than one ring, as in the case of naphthylene bis(sulfonyl azides). Poly (sulfonyl)azides include such compounds as 1,5-pentane bis(sulfonylazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

The following discussion regarding the coupling reaction mechanism provides the inventors current theories but is not intended to limit the scope of this invention. Sulfonyl azides decompose in several ways, but for the practice of the invention, the reactive species, believed to be the singlet nitrene, as evidenced by insertion into C—H bonds is desired. Thermal decomposition is reported to give an intermediate singlet sulfonyl nitrene, which will react readily by insertion into carbon-hydrogen bonds. The high temperatures necessary for efficient formation of the sulfonyl nitrene is usually greater than about 150° C. When BSA such as, 4,4'-Oxydibenzenesulfonyl azide (DPO-BSA) is used for the coupling agent, polymer stream temperatures of greater than 250° C. are preferably avoided while there is significant unreacted azide in the reaction mixture.

The poly(sulfonyl azide) is preferably mixed with the propylene polymer before the resulting mixture is heated to the decomposition temperature of the poly(sulfonyl azide). By decomposition temperature of the poly(sulfonyl azide) is meant that temperature at which a substantial percentage of the azide is converted to the sulfonyl nitrene, eliminating nitrogen and more heat in the process. The decomposition temperature may be determined by differential scanning calorimetry (DSC). For instance, a differential scanning calorimeter (DSC) thermogram of the DPO-BSA shows no change in the heat flow until a sharp endothermic melting peak is observed at 100° C. The baseline is flat again (no heat flow) until a broad exothermic peak is observed that begins about 150° C., peaks at 185° C. (referred to herein as the peak decomposition temperature) and is complete by 210° C. The total amount of energy released due to decomposition of the sulfonyl azide groups is about 1500 Joules/ gram. Preferably, the poly(sulfonyl azide) is heated to at least the peak decomposition temperature. The poly(sulfonyl azides) used advantageously have a peak decomposition temperature greater than about 150° C., preferably greater than about 160° C., more preferably greater than about 180° C.

The amount of poly(sulfonyl azide) is preferably at least about 50 parts per million by weight (ppm), more preferably at least about 75 ppm, most preferably at least about 100 ppm, and in some instances, preferably at least about 150 ppm. In the practice of the invention, formation of crosslinked networks to an extent that would result in intractable propylene polymer is to be avoided; therefore, poly(sulfonyl azide) is preferably limited to that amount which results in chain coupled or rheology modified (but not substantially crosslinked) propylene polymer, preferably less than about 2000 ppm, more preferably less than about 1500 ppm, most preferably less than about 1300 ppm poly(sulfonyl azide) based on the total weight of propylene polymer. Substantial crosslinking is characterized by the presence of gels of sufficient size or weight percentage such that the processing of the film is detrimentally affected. Such detrimental effects include increased operating amperage, discontinuities in or undispersed materials in the film, increased back pressure, and/or, partial die plugging due to gels or black specs. The amount to be used depends on the melt flow rate of the starting and targeted propylene polymers and can be determined by the skilled person.

The propylene polymer and coupling agent are suitably combined in any manner which results in desired reaction thereof, preferably by mixing the coupling agent with the polymer under conditions which allow sufficient mixing before or during reaction to avoid unnecessary or undesirable amounts of localized reaction. An undesirable amount is an amount that interferes with the purpose of the final product. In a preferred embodiment the process of the present invention takes place in a single vessel, that is mixing of the coupling agent and polymer takes place in the same vessel as heating to the decomposition temperature of the coupling agent. The vessel is most preferably a twin-screw extruder, but preferably a single-screw extruder or advantageously a melt mixer, including a batch mixer. The reaction vessel more preferably has at least two zones of different temperatures into which a reaction mixture would pass.

In the most preferred embodiment, the propylene polymer and the coupling agent are physically mixed at a temperature that is low enough to minimize the reaction between the coupling agent and the polymer. Such physical mixing can occur in any equipment, such as V-blenders, ribbon or paddle blenders, tumbling drums, or extruders, which will mix the coupling agent and the propylene polymer. The term extruder is used for its broadest meaning to include such devices as a device that extrudes pellets as well as an extruder which produces the extrudate for forming into articles, such as a film.

Preferably, this physical mixing occurs in the early stages of an extruder, most preferably a twin screw extruder. In particular, this embodiment may be practiced by simultaneously introducing the propylene polymer resin and the coupling agent into the feed section of an extruder. The extruder is configured to have a first section that physically mixes and conveys the coupling agent and polymer in a manner that minimizes the reaction between the coupling agent and the polymer. The conveying first section is followed by at least a second section where the coupling agent and polymer are rapidly further mixed and sufficient heat is added to cause significant reaction between the coupling agent and polymer.

In another embodiment, the mixing is preferably attained with the polymer in a molten or at least partially melted state, that is, above the softening temperature of the polymer, or in a dissolved or finely dispersed condition rather than in a solid mass or particulate form. Any mixing equipment is suitably used in this embodiment, preferably equipment which provides sufficient mixing and temperature control in the same equipment, but advantageously practice of this embodiment takes place in such devices as an extruder, melt mixer, pump conveyor or a polymer mixing devise such as a Brabender melt mixer. While it is within the scope of this embodiment that the reaction take place in a solvent or other medium, it is preferred that the reaction be in a bulk phase to avoid later steps for removal of the solvent or other medium.

Melt phase mixing is advantageous for forming a substantially uniform admixture of coupling agent and polymer before exposure to conditions in which chain coupling takes place. Conveniently for this embodiment, the formation of a substantially uniform admixture occurs along a temperature profile within equipment such as an extruder. The first zone is advantageously at a temperature at least equal to the softening temperature of the polymer(s) and preferably less than the decomposition temperature of the coupling agents and the second zone is at a temperature sufficient for decomposition of the coupling agent. Especially in the case of propylene polymers, most preferably the propylene polymer(s) and coupling agent are exposed to a profile of melt stream temperatures ranging from about 160° C. to about 250° C.

Those skilled in the art recognize that a polymer, or mixture thereof, typically melts over a range of temperatures rather than melting sharply at one temperature. For the practice of this embodiment, it is sufficient that the polymer be in a partially melted state. For convenience, the temperature of this degree of melting can be approximated from the differential scanning calorimeter (DSC) curve of the polymer or mixture thereof to be treated.

Conveniently, when there is a melt extrusion step between production of the polymer and its use, at least one step of the process of the invention takes place in the melt extrusion step. The heat produced during the extrusion step provides the energy necessary to cause the reaction between the coupling agent and the target polymer.

For all embodiments, a temperature of at least the decomposition temperature of the coupling agent is preferably maintained for a time sufficient to result in decomposition of at least sufficient coupling agent to avoid later undesirable reaction, preferably at least about 80, more preferably at least about 90, most preferably at least about 95 weight percent of the coupling agent is reacted. Those skilled in the art realize that this time is dependent on whether the temperature is one at which the coupling agent slowly decomposes or one at which it very rapidly decomposes. Preferably, the time will be at least about 5 seconds, more preferably at least about 10 seconds to avoid unreacted coupling agent, and subsequent undesirable reactions, or to avoid the need for inconveniently, possible destructively high temperatures. Conveniently, the reaction time is about 20 seconds.

Additives are optionally included in the propylene polymers. Additives are well within the skill in the art. Such additives include, for instance, stabilizers including free radical inhibitors and ultraviolet wave (UV) stabilizers, neutralizers, nucleating agents, slip agents, antiblock agents, pigments, antistatic agents, clarifiers, waxes, resins, fillers such as silica and carbon black and other additives within the skill in the art used in combination or alone. Effective amounts are known in the art and depend on parameters of the polymers in the composition and conditions to which they are exposed.

In addition, other thermoplastic polymers may be blended with the propylene polymers provided the desired foam properties are achieved. Examples of these include high- and low-density polyethylenes, ethylene-vinyl aromatic interpolymers, polybutene-1,ethylene-vinyl acetate copolymer, ethylene-propylene rubber, styrene-butadiene rubber, ethylene-ethyl acrylate copolymer and the like, that may be mixed into the above-mentioned propylene polymer, so long as the latter is the main component in the resulting mixture and the mixture is of uniform quality.

The foams of the present invention may be prepared by a process comprising heating a propylene polymer having a melt flow rate from 0.2 to 20 g/10 min and a melt strength of at least 39 cN, optionally mixed with a nucleating agent to a molten state to produce a molten polymer material, and mixing said molten polymer material with a blowing agent under conditions to produce a foamed material having a density in the range of from 9.6 to 801 kg/m$^3$ (0.6 to 50 lbs/ft$^3$), wherein the propylene polymer is obtained by a coupling treatment carried out before, during or after admixture with the blowing agent. The molten polymer material is most preferably mixed with a blowing agent under conditions that preclude foaming to form a foamable gel, and then exposing the foamable gel to conditions conducive to foaming to produce a foamed material. A foam is conveniently prepared by heating a propylene polymer having has a melt strength $\geq 39$ cN at a drawability from 15 to 60 mm/sec, to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator is blended in the polymer melt or dry blended with the polymer material prior to plasticizing or melting. The foamable gel is typically cooled to a lower temperature to optimize physical characteristics of the foam structure. The gel is optionally cooled in the extruder or other mixing device or in separate coolers, preferably to a temperature above, more preferably at least about 5° C. above, most preferably up to about 40° C. above, the softening point or crystallization temperature of the propylene polymer. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (evacuated or vacuum), but is preferably at an atmospheric level. Preferably, the gel is extruded into a zone of atmospheric pressure at a temperature that is about the melting temperature of the polypropylene, or less than the melting temperature, but above the crystallization temperature of the polypropylene. The melting temperature and crystallization temperatures are determined by a DSC test method.

Other suitable processes are a coalesced foam process as described in U.S. Pat. No. 4,824,720 and an accumulating extrusion process described in U.S. Pat. No. 4,323,528, both hereby incorporated by reference.

U.S. Pat. No. 4,824,720, which describes the coalesced (or strand) foam process. This patent describes a method for providing a closed cell foam structure comprising a plurality of coalesced extruded strands or profiles by extrusion foaming of a molten thermoplastic composition utilizing a die containing a multiplicity of orifices. The orifices are so arranged such that the contact between adjacent streams of the molten extrudate occurs during the foaming process and the contacting surfaces adhere to one another with sufficient adhesion to result in a unitary structure. The individual strands of coalesced foam should remain adhered into a unitary structure to prevent strand delamination under stresses encountered in preparing, shaping, and using the foam.

U.S. Pat. No. 4,323,528 describes an accumulating extrusion process. In this accumulating extrusion process low density, elongated cellular bodies having large lateral cross-sectional areas are prepared by: 1) forming, under pressure, a mixture of a thermoplastic polymer and a blowing agent, with the mixture having a temperature at which the viscosity of the mixture is sufficient to retain the blowing agent when the mixture is allowed to expand; 2) extruding the mixture into a holding zone maintained at a temperature and pressure which does not allow the mixture to foam, the holding zone having an outlet die defining an orifice opening into a zone of lower pressure at which the mixture foams, and an openable gate closing the die orifice; 3) periodically opening the gate; 4) substantially concurrently applying mechanical pressure by a movable ram on the mixture to eject the mixture from the holding zone through the die orifice into the zone of lower pressure, at a rate greater than that at which substantial foaming in the die orifice occurs and less than that at which substantial irregularities in cross-sectional area or shape occurs; and 5) permitting the ejected mixture to expand unrestrained in at least one dimension to produce an elongated thermoplastic cellular body.

In the practice of the invention where a propylene polymer is used which is obtained by reaction with a coupling agent, such as a poly(sulfonyl azide), this coupling treatment may be carried out before, during or after admixture with the blowing agent. Conveniently the coupling agent is admixed with the polymer preferably before or optionally during admixture with the blowing agent and the admixture is heated at least to the decomposition temperature of the poly(sulfonyl azide) for a period sufficient to result in coupling before the foam is formed.

Blowing agents (also referred to herein as foaming agents) useful in making the present foam include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC- 143a), 1,1,1,2-tetrafluoroethane (HFC-134a), 1,1,2,2-tetrafluoromethane (HFC-134), 1,1,1,3,3-pentafluorobutane (HFC-365mfc), 1,1,1,3,3-pentafluoropropane (HFC$_{13}$ 245fa), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

Though the present process optionally employs any known blowing agent, preferred blowing agents are volatile blowing agents having a boiling point temperature range of −50° C. to +50° C. and include, but are not limited to aliphatic hydrocarbons such as n-pentane, isopentane, neopentane, isobutane, n-butane, propane and the like; fluorochlorinated hydrocarbons such as dichlorotetrafluoroethane, trichlorotrifluoroethane, trichloromonofluoromethane, dichlorodifluoromethane, dichloromonofluoromethane and the like; and so on. Among them, the non-fully halogenated hydrocarbons are preferable in point of environmental considerations. Particularly preferred among the non-fully halogenated hydrocarbons are partially or fully fluorinated hydrocarbons and non-fully halogenated fluoro-chlorinated hydrocarbons. Examples of these include 1-chloro-1-fluoroethane and 1,1-difluoroethane. Particularly preferred among the aliphatic hydrocarbons are isobutane and isobutane/n-butane mixtures. Also contemplated are combinations of these blowing agents with minor amounts of $CO_2$, $H_2O$, $N_2$ and argon in the mixtures.

In general, incorporation of a greater amount of blowing agent results in a higher expansion ratio (the term "expansion ratio" herein referred to means the ratio (density of resin)/(density of expanded product)) and thus a lower foam density. However care must be taken not to incorporate an amount of blowing agent that causes a separation between resin and blowing agent during the foam conversion process. When this happens, "foaming in the die" occurs, the surface of the expanded product becomes rough and no good expanded product is obtainable. The amount of blowing agent incorporated into the polymer melt material to make a foam-forming polymer gel preferably is from about 0.04 to 6.0 gram-moles per kilogram of polymer, more preferably from about 0.05 to 6.0 gram-moles per kilogram of polymer, and most preferably from about 0.055 to 6.0 gram-moles per kilogram of polymer.

A nucleating agent is optionally added to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. The amount of nucleating agent employed advantageously ranges from about 0.01 to about 5 parts by weight per hundred parts by weight of a polymer resin. The preferred range is from 0.1 to about 3 parts by weight.

In general, an increased amount of nucleating agent gives a smaller diameter of cell. However, if the amount exceeds 5 parts by weight, agglomeration or insufficient dispersion of nucleating substance occurs, so that the diameter of the cell becomes greater. On the contrary if the amount is less than 0.01 part by weight, the nucleating action is too feeble to decrease the diameter of the cells.

The present foam preferably has a density of from about 9.6 to 801 kg/m$^3$ (0.6 to 50 lbs/ft$^3$) measured according to ASTM D-1622–88, more preferably from about 9.6 to 721 kg/m$^3$ (0.6 to 45 lbs/ft$^3$), most preferably from 9.6 to about 641 kg/m$^3$ (0.6 to about 40 lbs/ft$^3$). Preferred low den foams have a foam density ranging from 16 to 320 kg/m$^3$ (1 to 20 lbs/ft$^3$).

The foam preferably has an average cell size of about 6 mm or less measured according to ASTM D3576–77.

The foam optionally takes any physical configuration known in the art such as bead, sheet or plank or coalesced strands. The foam is particularly suited to be formed by extrusion into a region formed of air, vacuum or partially vacuumed environment, or water.

The foam is optionally closed cell or open cell. A typical amount of closed cells is more than 50 percent. Preferred closed-cell foams have greater than 80 percent closed cell content measured according to ASTM D2856–87.

Various additives are optionally incorporated in the foam structure such as inorganic fillers, pigments, dyes, antioxidants, acid scavengers, ultraviolet absorbers, flame retardants, processing aids, extrusion aids, and the like.

According to a further aspect the present invention relates to an expandable composition comprising a coupled propylene polymer having a melt strength of ≧39 cN, a drawability from 15 to 60 mm/sec, and a melt flow rate from 0.2 to 20 g/10 min, and a blowing agent. The expandable composition may comprise the blowing agent, as well as a nucleating agent and other additives as mentioned in this specification, in the amounts described herein.

The foam according to the present invention is particularly suited for use in automotive interior and exterior applications for energy absorption and comfort cushioning, such as automotive headliners, door liners, energy absorption counter measure. It can be used in general cushion packaging and comfort cushioning market. It can be used as thermal insulation foams for insulating tanks, trucks, and cars as well as walls and roofs in residential and commercial buildings, refrigerators, etc. It can be used as sound insulation foams in automobiles as well as in buildings.

Additionally, expanded or expandable beads can be formed that can be subsequently molded into desired shapes for any of the above applications, including impact energy management, cushion packaging, bulk dunnage packaging and the like. The beads can also be molded into panels for use in insulating applications such as for roofing, walls, tanks, and the like.

EXAMPLES

The following examples are to illustrate this invention and do not limit it. Ratios, parts, and percentages are by weight unless otherwise stated. For the examples below, unless otherwise indicated: melt flow rate (MFR) is measured in accordance with ASTM D 1238, at a temperature of 230° C. under a weight of 2.16 KG. The yield modulus as described in the examples refers to the compressional yield modulus [MPa] defined as the stress at yield divided by strain at yield as measured in a standard compression test as determined using method ASTM D3575 Suffix D.

Example 1

Isotactic homopolypropylene pellets, commercially available from Montell USA under the name Profax 6231 having a MFR of 20 g/10 min, a Melt Strength: 0.76 cN at 190° C., a Drawability of 106.9 mm/s at 190° C. is used as the base resin (also referred to as Resin A). Resin A was tumble blended with 0.17 parts of silicone oil Dow Corning 550 fluid at room temperature for 30 minutes followed by tumble blending with 0.1 parts oxy-bis(4-sulfonyl azide) ("BSA") and 0.1 parts phenolic antioxidant commercially available from Ciba Geigy under the trade designation Irganox 1010 for an additional 30 minutes at room temperature (parts are relative to 100 parts of base resin). The resulting mixture was then fed into a 30 mm co-rotating, intermeshing twin-screw extruder (200 rpm), with a temperature profile of 150, 200, 200, 200° C. from the rear to the front of the extruder. It had a length to diameter ratio of 30, four heating zones, and was powered by a 11.2 kW (15 horsepower) motor. The extruder had a die-temperature of 230–250° C. to ensure full reaction of the BSA with the propylene polymer. The die pressure was 2.83–2.96 MPa (410430 psi). The torque was: 27.1–28.3 NM (240–250 in.lb). Polymer was metered to the extruder (about 13.6 Kg/hr (30 lb/hr)) using a AccuRate volumetric feeder. The extrudate from the two strand (3.0 mm dia. die holes) die was passed through two water baths in series, and granulated using a Conair model 304 pelletizer. The resulting material is referred to herein as the Resin B. The resulting sample is characterized by: MFR: 2.36, Melt Strength: 69 cN at 190° C., Drawability: 35 mm/s at 190° C.

Foam was produced from Resin B, using a continuous process, by blending Resin B in an extruder with 0.5 pph talc, 0.5 pph calcium stearate agent and 0.1–0.3 pph antioxidant (for instance Irganox 1010). 6 pph of iso-butane blowing agent was added to the molten polymer at high pressure and temperature to ensure homogeneous distribution. The melt temperature was then cooled down, at which temperature nucleation of the bubble in the die can occur as the pressure decreases. This temperature is referred to as "foaming temperature". The melt was extruded through a die to room temperature and pressure, which then results in an expanding foam and cell stabilization.

Foam was produced on a pilot foaming line in the form of a strand foam. The extrusion rate was constant at 18.1 kg/h (40 lb/h) of polymer. The line had a 44.5 mm (1¾") single screw extruder, a mixer, coolers and a die. The die was a standard strand-foam-die with 1.1 mm (0.042") diameter holes and 3.7 mm (0.144") hole-to-hole distance. Each hole has a 60° included approach angle (30° from the centerline). Cooler exit temperature: 156° C. Die face temperature: 160° C. Die pressure: 2.94 MPa (426 psi). Extruder pressure: 6.28 MPa (911 psi). Rollers at the die exit were used on both top and bottom of the strand foam. Line speed: 0.071 m/s (14 fpm).

The resulting foam is characterized by: density of 45 kg/m$^3$ (2.81 pcf) (measured 1 hr. after foaming); an average cell size of 0.96 mm; an open cell content of 36% (Beckman number); and a porosity of 13.1% (water absorbance).

Example 2

Analogous to the procedures in Example 1, Resins C, D, and E are prepared by: reacting an isotactic polypropylene resin of a melt flow rate of 20 g/10 min with 1200 ppm of BSA in a 40-mm-diameter extruder (Resin C); reacting an isotactic polypropylene resin (Profax 6231 available form Montell) of a melt flow rate of 20 g/10 min with 1200 ppm of BSA in a 92-mm-diameter extruder (Resin D); and reacting an isotactic polypropylene resin of melt flow rate 20 g/10 min (Dow Polypropylene H701–20) with 1000 ppm of BSA in a 30-mm-diameter extruder (Resin E).

Foams are prepared from Resins C, D, and E under conditions analogous to those in example 1, using the specific conditions listed in Table 1. As comparative Examples, foams are prepared from Profax PF814 and Profax 6823 (both available from Montell), designated as resins F and G, respectively.

These examples demonstrate that according to the present invention foams can be prepared with a lower open cell content, or a higher closed cell content, than the comparative foams at the same foamability factor. This is surprising because according to U.S. Pat. No. 5,527,573 a lower foamability factor is required to achieve a similar low open cell content: a foamability factor of less than 1.8 for an open cell content of less than 20% or a foamability factor between 1.8 and 2.8 for an open cell content in the range of 20–50%.

A comparison of the foams of Resin D, Run 5 and of Comparative Resin F, Run 2 shows that according to the present invention while using a lower amount of blowing agent a foam of the same foamability factor is obtained yet with remarkably decreased content of open cells.

TABLE 1

| Resin | Run | Foaming T, [° C.] | isobutane [wt. %] | Density [kg/m$^3$ (pcf)] | Cell Size, [mm] | tan δ, resin | Foamability Factor | Open Cell, [%] | Yield modulus, [MPa] |
|---|---|---|---|---|---|---|---|---|---|
| C | 1 | 165 | 6 | 46.1 (2.88) | 1.03 | 1.033 | 3.0 | 35 | — |
| C | 2 | 162 | 6 | 48.1 (3) | 0.91 | 1.033 | 2.8 | 26 | — |
| C | 3 | 160 | 6 | 48.9 (3.05) | 0.9 | 1.033 | 2.8 | 24 | — |
| C | 4 | 158 | 6 | 49.2 (3.07) | 0.95 | 1.033 | 3.0 | 28 | — |
| C | 5 | 158 | 6 | 53.0 (3.31) | 0.96 | 1.033 | 3.3 | 25 | — |
| D | 1 | 154 | 7.5 | 44.1 (2.75) | 0.96 | 1.24 | 3.1 | 43 | — |
| D | 2 | 156 | 7.5 | 41.5 (2.59) | 1.24 | 1.24 | 3.8 | 34 | — |

TABLE 1-continued

| Resin | Run | Foaming T, [° C.] | isobutane [wt. %] | Density [kg/m³ (pcf)] | Cell Size, [mm] | tan δ, resin | Foamability Factor | Open Cell, [%] | Yield modulus, [MPa] |
|---|---|---|---|---|---|---|---|---|---|
| D | 3 | 154 | 7.5 | 42.9 (2.68) | 1.24 | 1.24 | 3.9 | 43 | — |
| D | 4 | 152 | 7.5 | 47.4 (2.96) | 0.97 | 1.24 | 3.4 | 32 | — |
| D | 5 | 162 | 5.8 | 38.4 (2.4) | 0.8 | 1.24 | 2.3 | 15 | 4.64 |
| E | 1 | 158 | 6 | 45.0 (2.81) | 0.96 | 1.18 | 2.9 | 36 | 4.43 |
| F* | 1 | 158 | 6.5 | 42.6 (2.66) | 0.8 | 1.17 | 2.4 | 22 | — |
| F* | 2 | 158 | 6.5 | 40.4 (2.52) | 0.82 | 1.17 | 2.3 | 37 | — |
| F* | 3 | 155 | 6.5 | 38.3 (2.39) | 0.85 | 1.17 | 2.3 | 26 | — |
| G* | 1 | 152 | 16 | 17.6 (1.1) | 0.3 | 1.24 | 0.4 | 11 | — |

*Comparative examples

What is claimed is:

1. A foam comprising a coupled propylene polymer and having a density in the range of from 9.6 to 801 kilograms per cubic meter and having either a foamability factor of more than 1.8 to less than 2.8 and an open cell content less than 20 percent, or a foamability factor of equal to or more than 2.8 and less than 15 and an open cell content of less than 50 percent.

2. The foam of claim 1, wherein the foam has either a foamability factor of more than 1.8 to less than 2.8 and an open cell content less than 20 percent, or a foamability factor of equal to or more than 2.8 and less than 6 and an open cell content of less than 50 percent.

3. The foam according to claim 1, wherein the coupled propylene polymer has a melt strength of ≧39 centiNewtons, a drawability from 15 to 60 millimeters per second, and a melt flow rate from 0.2 to 20 grams per 10 minutes.

4. The foam according to claim 3, wherein the propylene polymer is isotactic.

5. A process for preparing a foam comprising heating a coupled propylene polymer having a melt flow rate from 0.2 to 20 grams per 10 minutes and a melt strength of at least 39 centiNewtons, optionally mixed with a nucleating agent, to a molten state to produce a molten polymer material, and mixing said molten polymer material with a blowing agent under conditions to produce a foamed material having a density in the range of from 9.6 to 801 kilograms per cubic meter.

6. The process according to claim 5, wherein the propylene polymer has a melt strength of at least 39 centiNewtons and a drawability from 15 to 60 millimeters per second.

7. An article comprising a foam according to claim 1.

* * * * *